(12) United States Patent
Elango et al.

(10) Patent No.: US 12,332,839 B2
(45) Date of Patent: Jun. 17, 2025

(54) IMMUTABLE OBJECT LOCKING FOR SNAPSHOT MANAGEMENT

(71) Applicant: Rubrik, Inc., Palo Alto, CA (US)

(72) Inventors: Haritha Elango, Bangalore (IN); Prakhar Kumar, Mountain View, CA (US); Partha Dhar, Bangalore (IN); Animesh Kumar, Navi Mumbai (IN); Gaurav Maheshwari, Bangalore (IN); Srikanth Hanumanula, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/081,673

(22) Filed: Dec. 14, 2022

(65) Prior Publication Data

US 2024/0202162 A1    Jun. 20, 2024

(51) Int. Cl.
*G06F 16/00* (2019.01)
*G06F 11/14* (2006.01)
*G06F 16/11* (2019.01)

(52) U.S. Cl.
CPC ........ *G06F 16/128* (2019.01); *G06F 11/1448* (2013.01); *G06F 2201/84* (2013.01)

(58) Field of Classification Search
None
See application file for complete search history.

(56) References Cited

U.S. PATENT DOCUMENTS

| 8,321,632 | B2 * | 11/2012 | Revanuru | G06F 12/0842 |
| | | | | 711/E12.017 |
| 8,335,768 | B1 * | 12/2012 | Desai | G06F 11/1448 |
| | | | | 707/694 |
| 9,645,762 | B2 * | 5/2017 | Nara | G06F 3/0619 |
| 10,073,650 | B2 * | 9/2018 | Nara | G06F 11/14 |
| 10,176,036 | B2 * | 1/2019 | Haridas | G06F 16/16 |

(Continued)

FOREIGN PATENT DOCUMENTS

CN    109409126 A    3/2019

OTHER PUBLICATIONS

A distributed repository for immutable persistent objects (Year: 1986).*

(Continued)

*Primary Examiner* — Jean M Corrielus
(74) *Attorney, Agent, or Firm* — Holland & Hart LLP

(57) ABSTRACT

Methods, systems, and devices for data management are described. A data management system (DMS) may receive an indication of a storage configuration for an object storage location within a cloud environment. The DMS may generate a snapshot of a computing system in accordance with a backup policy associated with the computing system. The DMS may cause one or more data objects corresponding to the snapshot to be stored in the object storage location within the cloud environment in accordance with the storage configuration. The DMS may apply immutable object locks to the one or more data objects within the object storage location. The DMS may execute, in accordance with the backup policy associated with the computing system, one or more jobs that cause the respective immutable object locks for the one or more data objects to be extended one or more times during a retention period for the snapshot.

20 Claims, 10 Drawing Sheets

(56) References Cited

U.S. PATENT DOCUMENTS

| | | | |
|---|---|---|---|
| 10,248,494 B2* | 4/2019 | Haridas | G06F 11/3055 |
| 10,474,388 B2* | 11/2019 | Nara | G06F 3/0659 |
| 10,721,141 B1 | 7/2020 | Verma et al. | |
| 10,853,162 B2* | 12/2020 | Haridas | G06F 11/3495 |
| 11,169,729 B2* | 11/2021 | Nara | G06F 11/2094 |
| 11,188,248 B2* | 11/2021 | Reddy A V | G06F 11/1451 |
| 11,474,896 B2* | 10/2022 | Haridas | G06F 16/10 |
| 11,928,032 B2* | 3/2024 | Karthik | G06F 11/1461 |
| 12,001,451 B2* | 6/2024 | Gokhale | G06F 11/1448 |
| 2008/0046476 A1 | 2/2008 | Anderson et al. | |
| 2014/0188804 A1* | 7/2014 | Gokhale | G06F 21/6218 |
| | | | 707/645 |
| 2015/0254141 A1* | 9/2015 | Wertheimer | G06F 11/1456 |
| | | | 707/646 |
| 2016/0350029 A1* | 12/2016 | Nara | G06F 3/0622 |
| 2017/0123889 A1* | 5/2017 | Haridas | G06F 16/11 |
| 2017/0123890 A1* | 5/2017 | Haridas | G06F 11/0769 |
| 2018/0025034 A1 | 1/2018 | Gnanamani et al. | |
| 2018/0336210 A1* | 11/2018 | Bourgeois | G06F 3/0604 |
| 2019/0005106 A1 | 1/2019 | Kalach et al. | |
| 2019/0034295 A1* | 1/2019 | Bourgeois | G06F 16/125 |
| 2019/0095272 A1* | 3/2019 | Haridas | G06F 11/0706 |
| 2019/0179710 A1* | 6/2019 | Derryberry | G06F 11/1451 |
| 2020/0019470 A1 | 1/2020 | Wolfson et al. | |
| 2020/0117365 A1* | 4/2020 | Patwardhan | G06F 3/0671 |
| 2020/0142780 A1* | 5/2020 | Derryberry | G06F 11/1461 |
| 2020/0285546 A1* | 9/2020 | Kraplanee | G06F 21/6245 |
| 2021/0042184 A1* | 2/2021 | Haridas | G06F 11/3495 |
| 2021/0096958 A1* | 4/2021 | Kumar | G06F 16/128 |
| 2021/0141698 A1* | 5/2021 | Bourgeois | G06F 16/353 |
| 2021/0232318 A1* | 7/2021 | Reddy A V | G06F 3/067 |
| 2022/0083514 A1 | 3/2022 | Rath et al. | |
| 2022/0107870 A1 | 4/2022 | Nagarajegowda et al. | |
| 2022/0222074 A1 | 7/2022 | Rath et al. | |
| 2022/0229805 A1 | 7/2022 | Chakeres et al. | |
| 2022/0342907 A1* | 10/2022 | Gokhale | G06F 16/125 |
| 2023/0032714 A1 | 2/2023 | Pandit et al. | |
| 2023/0083104 A1 | 3/2023 | Xiang et al. | |
| 2023/0359531 A1* | 11/2023 | Karthik | G06F 11/1464 |
| 2023/0359585 A1 | 11/2023 | George et al. | |
| 2024/0152431 A1* | 5/2024 | Karthik | G06F 11/1464 |

OTHER PUBLICATIONS

"International Search Report and Written Opinion of the International Searching Authority," issued in connection with Int'l Appl. No. PCT/US2023/079226, dated Mar. 1, 2024 (15 pages).

Jinsun, S., et al., "WORM-Based Data Protection Approach", Cyber-Enabled Distributed Computing and Knowledge Discovery, Oct. 10, 2010, pp. 410-416.

* cited by examiner

IMMUTABLE OBJECT LOCKING FOR SNAPSHOT MANAGEMENT

FIELD OF TECHNOLOGY

The present disclosure relates generally to data management, including immutable object locking for snapshot management.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
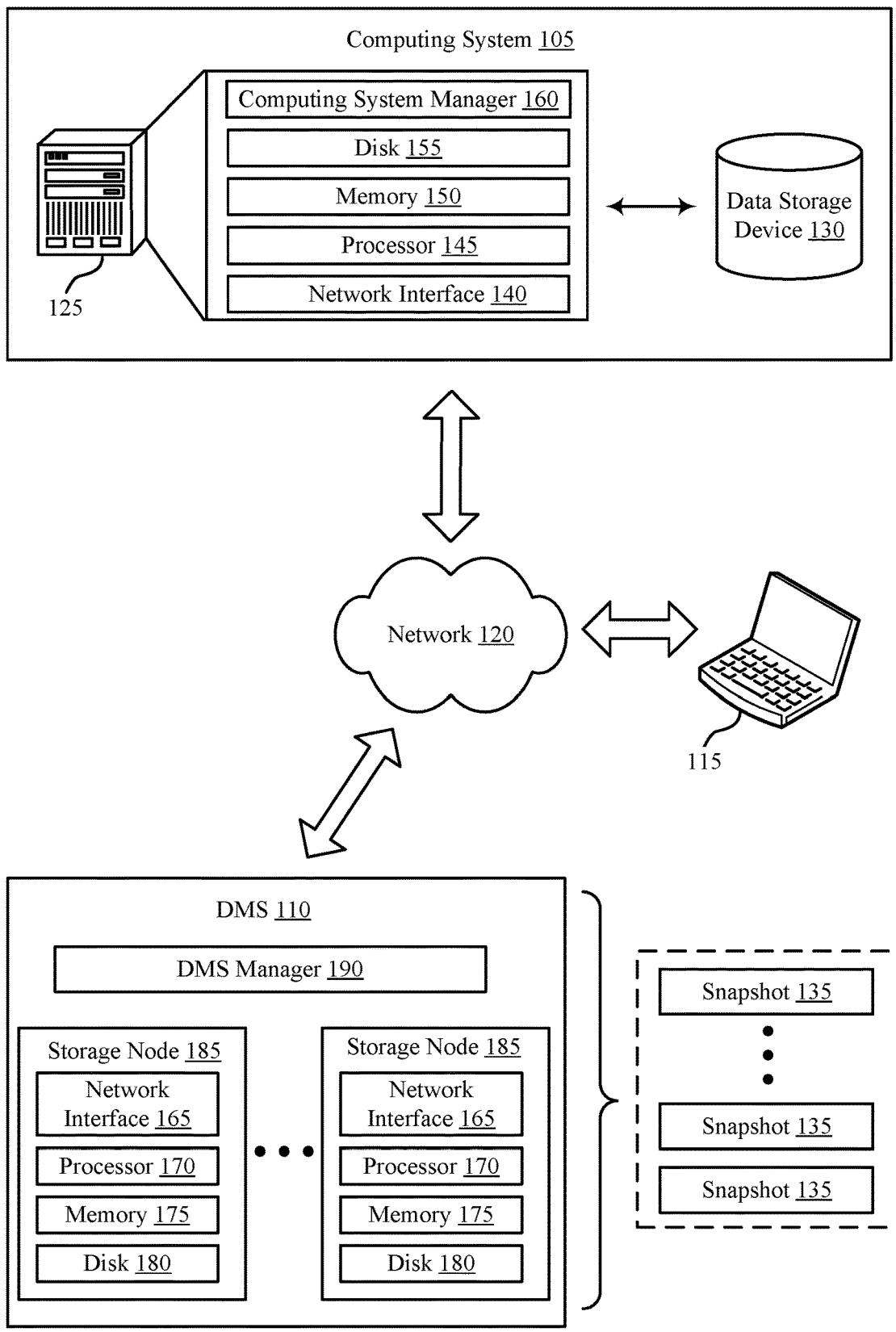
FIGS. 1 and 2 illustrate examples of computing environments that support immutable object locking for snapshot management in accordance with aspects of the present disclosure.

A data management system (DMS) may provide backup, recovery, and archival services for a computing system, which may include a large number of computing objects (e.g., applications, user accounts, files, metadata). To protect a computing system, the DMS may periodically generate full snapshots (which capture the state of the computing system at a given time) and incremental snapshots (which capture changes to the client application between two points in time) that can be used to recover the computing system in the event of data loss, corruption, failure, etc. The DMS may store and retain these snapshots in accordance with service level agreement (SLA) policies associated with the computing system. In some cases, the DMS may provide support for copying backup data (e.g., snapshots of a computing system) to a cloud environment (e.g., which may have lower storage costs compared to an initial storage environment used by the DMS). However, backup data within a cloud environment may be vulnerable to security threats, ransomware attacks, accidental deletion, etc.

Snapshots may be written to a cloud environment as one or more corresponding data objects (i.e., each snapshot may correspond to one or more data objects within the cloud environment). In some cases, a data object may alternatively be referred to as a data entity, a data pack, or a data blob. To improve the security of backup data stored on cloud resources, the DMS may use object locking capabilities supported by cloud providers to make the backup data objects temporarily immutable, thereby preventing other users from deleting or otherwise modifying the copies of the snapshots while the object lock is in effect. The maximum period of time for which an object lock can be applied to a data object (also referred to as the maximum lock duration) may be specified in client SLA policies. If the maximum lock duration is less than the retention period of a snapshot corresponding to a data object (e.g., the duration of time for which the snapshot is kept in storage), the DMS may periodically extend (re-apply) the immutability lock for that data object until the retention period for any snapshot that refers to the data object has expired.

As an example, a user associated with a computing system protected by the DMS (e.g., a client or customer of the DMS) may provide an indication of a configuration for an object storage location in a cloud environment. The DMS may generate a snapshot of the computing system in accordance with a backup policy associated with the computing system, and may cause one or more data objects corresponding to the snapshot to be stored in the object storage location according to the storage configuration. Thereafter, the DMS may apply respective immutable object locks to the one or more data objects stored in the object storage location. Accordingly, the DMS may execute one or more jobs that cause the respective immutable object locks to be extended one or more times during a retention period of the snapshot.

In some examples, the DMS may transfer the one or more data objects from the DMS to the object storage location in the cloud environment after a time duration specified in a cloud archival policy associated with the computing system. Each of the one or more data objects may include a portion of the corresponding snapshot (e.g., a block or chunk of backup data from the snapshot). In some examples, the DMS may determine whether to renew (extend) an immutable object lock on a data object based on whether the data object is referenced by any snapshot whose retention period has not yet expired. In some cases, a data object may be referenced in multiple snapshots. For example, if a data object from a full snapshot is referenced in a subsequent incremental snapshot that depends from the full snapshot, the DMS may ensure that the data object is immutable (e.g., unable to be deleted or modified) until the incremental snapshot expires or the data object is overwritten.

Aspects of the present disclosure may be implemented to realize one or more of the following advantages. The techniques described herein may enable the DMS to manage cloud archival processes for computing systems at scale with greater processing efficiency and reduced manual interaction. Aspects of the present disclosure may also reduce the risk of data being lost, corrupted, or accidentally deleted by providing the DMS with means to iteratively (re)configure immutable object locks for data objects stored in a cloud environment. Compared to other data storage schemes in which the effective duration of object immutability cannot be adjusted once configured, the techniques described herein may offer greater flexibility, lower data storage costs, and reduced overhead, among other benefits.

FIG. 1 illustrates an example of a computing environment 100 that supports immutable object locking for snapshot management in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone).

In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may include a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may include one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may include hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, where shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160) may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may include one or more types of memory (e.g., RAM, SRAM, DRAM, ROM, EEPROM, Flash, etc.). A disk 180 may include one or more HDDs, one or more SDDs, or any combination thereof. Memories 175 and disks 180 may include hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as a snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below:

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state-which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In accordance with the techniques described herein, the DMS 110 may receive an indication of a storage configuration for an object storage location within a cloud environment. The DMS 110 may generate a snapshot of the computing system 105 in accordance with a backup policy associated with the computing system 105. The DMS 110 may cause one or more data objects corresponding to the snapshot to be stored in the object storage location within the cloud environment in accordance with the storage configuration. The DMS 110 may apply immutable object locks (also referred to as locks or object locks) to the one or more data objects within the object storage location. The DMS 110 may execute, in accordance with the backup policy associated with the computing system, one or more jobs that cause the respective immutable object locks for the one or more data objects to be extended one or more times during a retention period for the snapshot.

Aspects of the computing environment 100 may be implemented to realize one or more of the following advantages. The techniques described with reference to FIG. 1 may enable the DMS 110 to manage cloud archival processes for the computing system 105 at scale with greater processing efficiency and reduced manual interaction. The described techniques may also reduce the risk of data being lost, corrupted, or accidentally deleted by providing the DMS 110 with means to iteratively (re)configure immutable object locks for data objects stored in a cloud environment. Compared to other data storage schemes in which the effective duration of object immutability cannot be adjusted once configured, the techniques described herein may offer greater flexibility, lower data storage costs, and reduced overhead, among other benefits.

Figure 2:
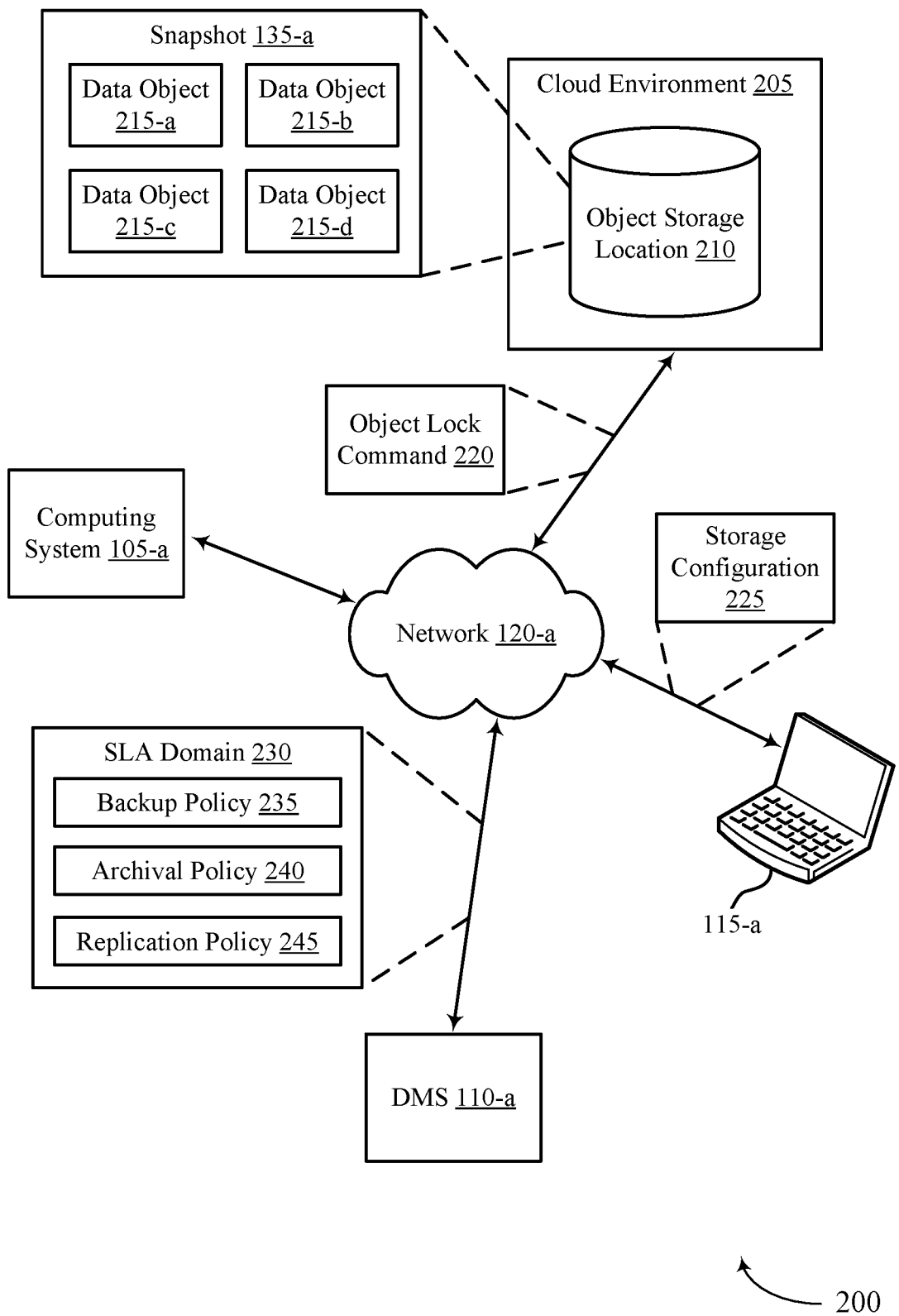

FIG. 2 illustrates an example of a computing environment 200 that supports immutable object locking for snapshot management in accordance with aspects of the present disclosure. The computing environment 200 may implement or be implemented by aspects of the computing environment 100. For example, the computing environment 200 includes a computing system 105-a, a DMS 110-a, and a network 120-a, which may be examples of corresponding elements described with reference to FIG. 1. The computing environment 200 also includes a cloud environment 205, which may be supported by a third-party cloud service provider. The cloud environment 205 and the DMS 110-a may, in some examples, be implemented in separate computing systems. In the example of FIG. 2, the DMS 110-a may transfer and store data objects 215 of a snapshot 135-a to an object storage location 210 within the cloud environment 205.

As described with reference to FIG. 1, the DMS 110-a may generate a snapshot 135-a that includes backup data associated with the computing system 105-a (for example, a customer of the DMS 110-a). The backup data in the snapshot 135-a may be partitioned or otherwise include a data object 215-a, a data object 215-b, a data object 215-c, and a data object 215-d. Thus, each of the data objects 215-a may include a portion of the snapshot 135-a. The DMS 110-a may generate the snapshot 135-a in accordance with a backup policy 235 of an SLA domain associated with the computing system 105-a. The backup policy 235 may define the frequency and type (full or incremental) of snapshots that are taken of the computing system 105-a. In some examples, the DMS 110-a may replicate the snapshot 135-a to different storage nodes of the DMS 110-a in accordance with a replication policy 245 of the SLA domain 230.

The DMS 110-a may provide users with the ability to copy cloud backups to an object storage location 210 in a cloud environment 205. In comparison to storing such backup information on resources managed by the DMS 110-a, for example, the object storage location 210 may offer lower data storage costs. Unlike other cloud storage systems in which cloud backup data may be vulnerable to attacks and/or accidental deletion, the third-party cloud service provider may provide the DMS 110-a with object locking capabilities that enable the DMS 110-a to configure an immutable object lock on the snapshot 135-a (e.g., cloud backup data associated with the computing system 105-a). This may help prevent accidental or malicious deletion or modification of objects within the object storage location 210, reduce the potential damage caused by compromised or malicious system administrator accounts, or any combination thereof, among other possible benefits.

The cloud environment 205 may provide users with the ability to make data objects 215 immutable (e.g., unchangeable). However, the locking mechanisms provided by the cloud environment 205 (more specifically, the third-party cloud service provider supporting the cloud environment 205) may take effect at the moment a data object is stored (e.g., written) to the cloud environment, and may remain active for the entire retention period of the data objects 215. Such schemes may result in poor flexibility and greater risk of data exposure. For example, once a data object is immutable, the user may be responsible for paying the associated storage costs for the entire lifetime (e.g., retention period) of the data object. This may have cost implications for users who discover a workload has an incorrect retention policy. Moreover, such systems may not have object immutability toggled by default. For example, due to the aforesaid risks, users may have to opt-in to enable data object locks and respective durations for the data object locks. This may leave users vulnerable to accidental and/or malicious data loss.

Within the cloud environment 205, backups may be stored within a user account. As such, a user with sufficient privileges may unintentionally delete the backups (for example, while cleaning up resources to save costs). Other accidental or malicious deletions or modifications of backup data may also be possible within the cloud environment 205. The techniques described herein may protect users from have their backups accidentally or maliciously lost or modified, and may help ensure that all cloud backups stay in compliance. Using immutable object locks also protects backup data from any changes or deletions, so users can rely on the immutable, tamper-proof cloud backups being immune to and recoverable from ransomware attacks. Furthermore, maintaining immutable backups can protect backup data from being tampered with or destroyed as a result of social engineering attacks (for example, when administrator credentials are compromised or stolen by threat actors).

In the example of FIG. 2, a user (for example, the computing device 115-a) may provide the DMS 110-a with a storage configuration 225 for the object storage location 210. The storage configuration 225 may enable the DMS 110-a to create and manage the object storage location 210, read and write data to and from the object storage location 210, set up immutability locks and/or change policies associated with data objects 215 stored in the object storage location 210. The DMS 110-a may setup the object storage location 210 in the cloud environment 205 based on the storage configuration 225 (which includes support for data object immutability). Thereafter, the user may create an SLA domain 230 and assign the SLA domain 230) to a cloud native workload associated with the computing system 105-a. Accordingly, the DMS 110-a may take the snapshot 135-a of the computing system 105-a in accordance with the backup policy 235 of the SLA domain 230.

When the snapshot 135-a surpasses a threshold time duration specified in an archival policy 240 of the SLA domain 230, the DMS 110-a may transfer the contents of the snapshot 135-a (e.g., the data objects 215) to the object storage location 210 in the cloud environment 205. Once the data objects 215 are stored in the object storage location 210, the DMS 110-a may orchestrate periodic jobs that, when executed, configure immutable locks on all pertinent data objects 215 in the object storage location 210. More specifically, the DMS 110-a may transmit (via the network 120-a) an object lock command 220 that includes instructions to set or extend immutable object lock(s) on one or more of the data objects 215. The DMS 110-a may ensure that the data objects 215 are immutable for the lifetime of the snapshot 135-a. After the retention period of the snapshot 135-a (e.g., after the snapshot 135-a expires), the DMS 110-a may delete the data objects 215 from the object storage location 210.

Figure 3:
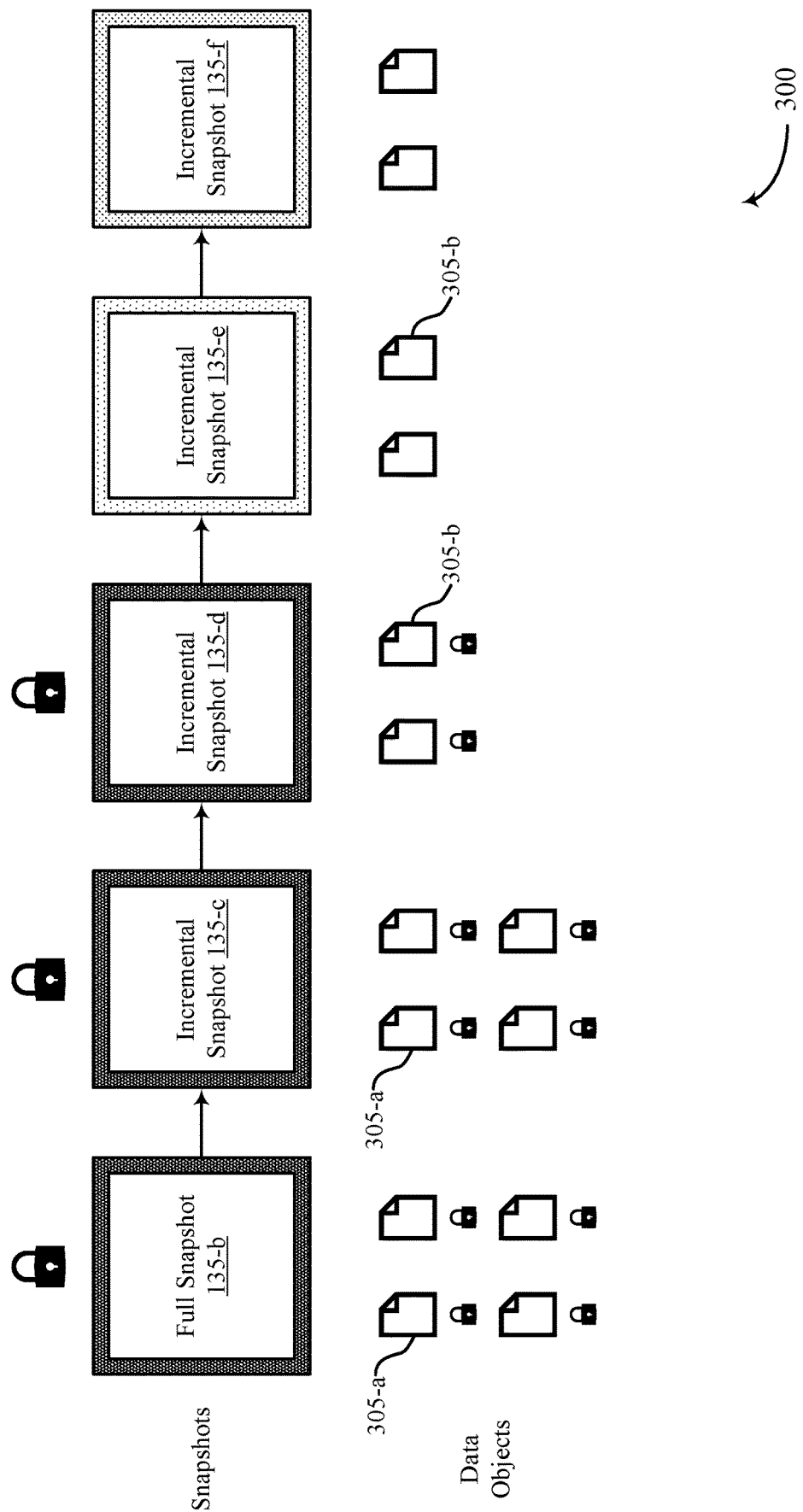
FIG. 3 illustrates an example of a snapshot diagram that supports immutable object locking for snapshot management in accordance with aspects of the present disclosure.

FIG. 3 illustrates an example of a snapshot diagram 300 that supports immutable object locking for snapshot management in accordance with aspects of the present disclosure. The snapshot diagram 300 may implement or be implemented by aspects of the computing environment 100 or the computing environment 200. For example, the snapshot diagram 300) includes a full snapshot 135-b, an incremental snapshot 135-c, an incremental snapshot 135-d, an incremental snapshot 135-e, and an incremental snapshot 135-f, which may be examples of the snapshots 135 described with reference to FIGS. 1 and 2. The snapshots 135 may be partitioned or otherwise divided into data objects 305, each of which may include a block or segment of cloud backup data from one of the snapshots 135. In the snapshot diagram 300, a DMS (such as the DMS 110-a described with reference to FIG. 2) may set and extend immutable object locks on the data objects 305 in accordance with a cloud archival policy for a computing system protected by the DMS.

As illustrated in the example of FIG. 3, the DMS may generate a full snapshot 135-b, an incremental snapshot 135-c, an incremental snapshot 135-d, an incremental snapshot 135-e, and an incremental snapshot 135-f of a computing system (such as the computing system 105-a described with reference to FIG. 2) or aspect thereof (e.g., a cloud-native workload associated with the computing system, an application executed by the computing system). The full snapshot 135-b may capture the state of the computing system at a first time, the incremental snapshot 135-c may capture changes to the computing system between the first time and a second time, the incremental snapshot 135-d may capture changes to the computing system between the second time and a third time, and so on.

The DMS may store, replicate, and archive the snapshots 135 in accordance with an SLA domain for the computing system. For example, the DMS may transfer one or more of the snapshots 135 to an object storage location in a cloud environment managed by a third-party service provider after a time duration specified in a cloud archival policy associated with the computing system. Each of the snapshots 135 may be stored as a collection of smaller data objects 305. The DMS may use immutable object locks to ensure that data objects in the object storage location are not tampered with or destroyed. As described herein, an immutable object lock may refer to a time-based object policy that effectively prevents users from deleting or otherwise modifying the contents of a data object while the immutable object lock is in effect.

To recover the computing system to a desired state, the DMS may use the data objects associated with a snapshot 135 that corresponds to the desired state. If the desired state corresponds to an incremental snapshot 135, the DMS may determine the desired state using that incremental snapshot 135 along with aspects of prior incremental snapshots 135 or the prior full snapshot 135 that remain accurate with respect to the desired state (e.g., to recover the computing system to a desired state that corresponds to the incremental snapshot 135-d, the DMS may determine the desired state based on data objects referenced by the incremental snapshot 135-d, along with any data objects referenced by the incremental snapshot 135-c or the full snapshot 135-b that still accurately reflected the state of one or more aspects of the computing system as of the time of the incremental snapshot 135-d). Due to the dependency between snapshots 135, the DMS may store and maintain snapshots 135 as an incremental snapshot chain. For example, the DMS may store the full snapshot 135-b, the incremental snapshot 135-c, the incremental snapshot 135-d, the incremental snapshot 135-e, and the incremental snapshot 135-f as an incremental snapshot chain. Thus, locking the incremental snapshot 135-d (for example, by applying immutable object locks to data objects 305 that collectively form the incremental snapshot 135-d) may involve locking some or all of the data objects associated with all snapshots 135 leading up to the incremental snapshot 135-d (for example, the full snapshot 135-b and the incremental snapshot 135-c).

In some cases, a data object may be referenced in more than one snapshot. For example, a data object 305-b may be present in (e.g., referred by, relied upon, or otherwise associated with) the incremental snapshot 135-d and the incremental snapshot 135-e. In such cases, the DMS may use selective job orchestration to ensure that the data object 305-b is locked at most once at any given time (to avoid redundancy and reduce costs). Thus, if the incremental snapshot 135-d is locked, the DMS may refrain from locking the instance of the data object 305-b in the incremental snapshot 135-e. Additionally, or alternatively, if a data object from an earlier snapshot is referenced in a later snapshot, the DMS may ensure that the data object is locked until the later snapshot expires or the data object is overwritten (e.g., changed). If, for example, a data object 305-*a* in the full snapshot 135-*b* is overwritten in the incremental snapshot 135-*c* (such that the earlier version of the data object 305-*a* is obsolete), the DMS may delete the data object 305-*a* from storage once the immutable object lock on the data object 305-*a* has expired.

In some examples, the DMS may use a rolling object lock window to provide users with greater flexibility, default security, and cost efficiency. For example, the periodic locking mechanisms described herein may provide more control to users with respect to storage and retention of cloud backups. Thus, if a user discovers that workload has been accidently assigned a longer retention period, the user can change the retention period without having to incur the higher storage costs associated with the longer retention period. Furthermore, cloud backups may protected against accidental or malicious deletions by default (e.g., without any action from the user). Also, the immutable object locking algorithms disclosed herein may ensure that the quantity of immutable object locks created in object storage (such as the object storage location 210 described with reference to FIG. 2) are minimal and/or optimized to provide data object immutability at the lowest cost.

Figure 4A:
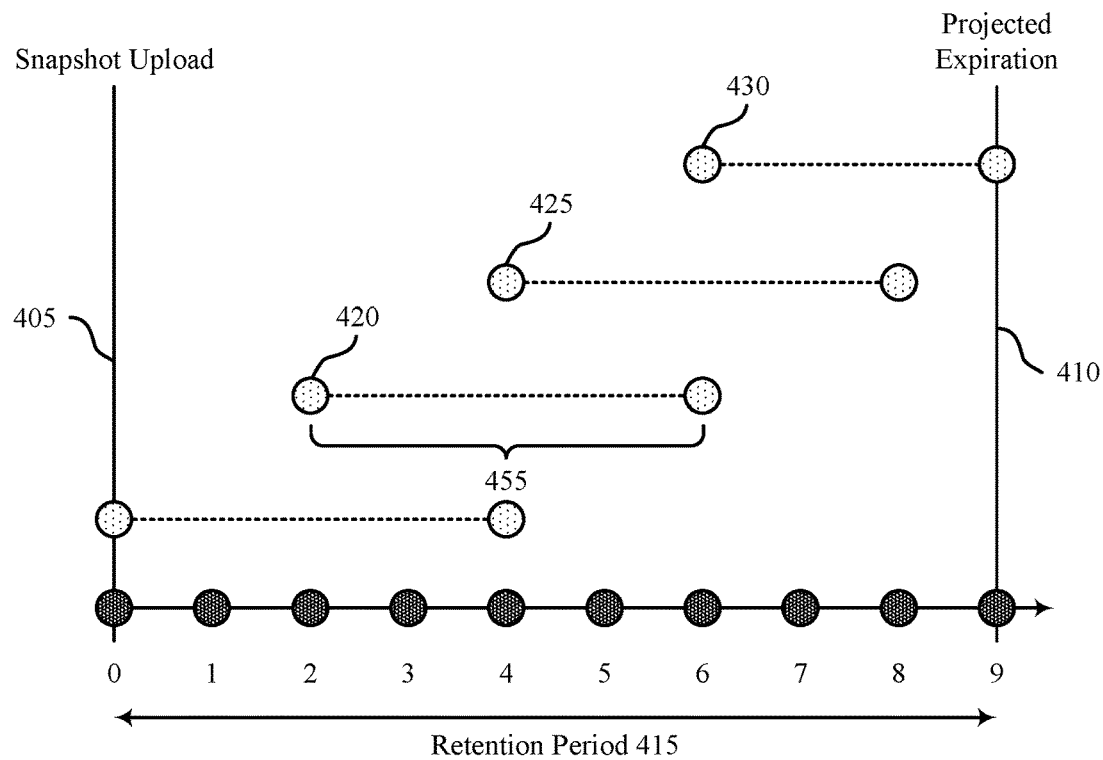
FIGS. 4A and 4B illustrate examples of timelines that support immutable object locking for snapshot management in accordance with aspects of the present disclosure.
Figure 4B:
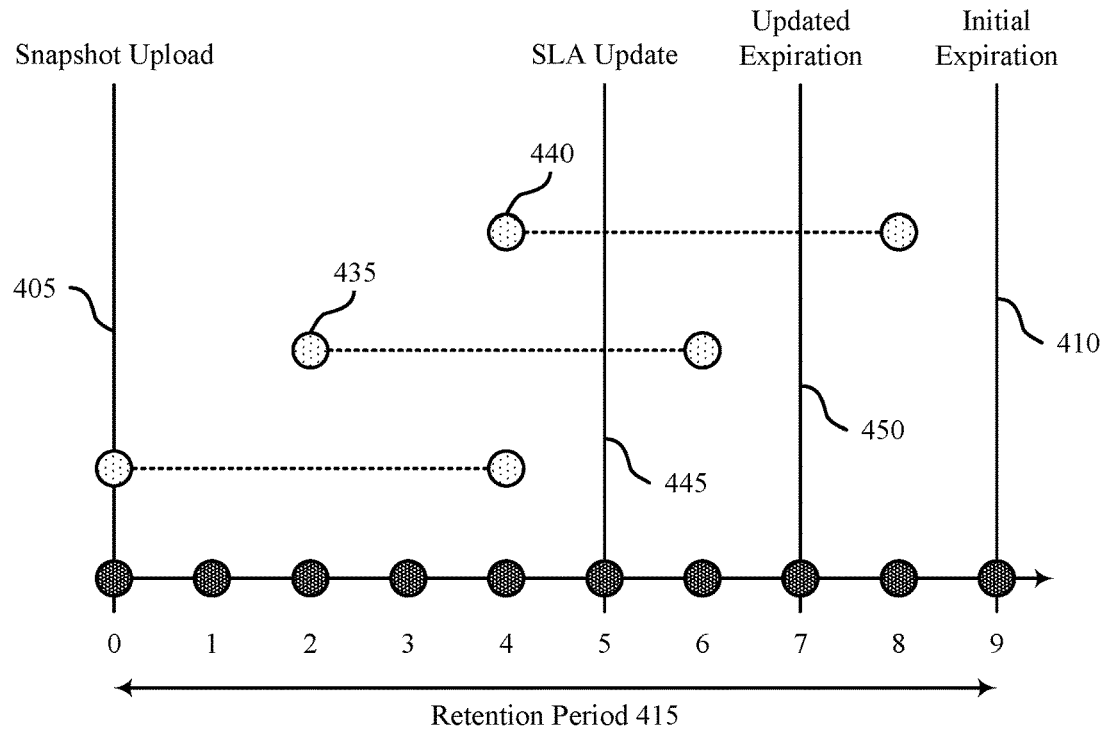

FIGS. 4A and 4B illustrate examples of a timeline 400 and a timeline 401 that support immutable object locking for snapshot management in accordance with aspects of the present disclosure. The timeline 400 and the timeline 401 may implement or be implemented by aspects of the computing environment 100, the computing environment 200, or the snapshot diagram 300. For example, the timeline 400 and/or the timeline 401 may be implemented by a DMS, such as the DMS 110 described with reference to FIG. 1. In the timeline 400 and the timeline 401, the DMS may iteratively configure immutable object locks for a data object (e.g., one of the data objects 305 described with reference to FIG. 3) stored in an object storage location within a cloud environment.

As described with reference to FIGS. 1 through 3, the DMS may transfer snapshots of a computing system to a cloud environment in accordance with a cloud archival configuration. The DMS may control the effective lifecycle of each snapshot, and may associate each snapshot with a validity end time (also referred to as an expiration time or retention period) based on the corresponding SLA policy. After the validity end time, the snapshot(s) can be deleted from storage. Throughout the lifetime (e.g., retention period) of a snapshot, the DMS may orchestrate periodic jobs that, when executed, cause the DMS to monitor the snapshot and determine whether to set or extend locks on data objects that collectively form the snapshot. Initially, the DMS may lock the data objects for a maximum lock duration, which refers to an application-specific configuration defining the maximum duration of any object lock created by the DMS. Thereafter, the DMS may periodically extend the object locks for the maximum lock duration until the expiration time of the snapshot is reached.

Provided that periodic lock extensions are performed in a timely manner (e.g., prior to the scheduled expiration of the current or active lock), the snapshot will be immutable throughout the retention period of the snapshot. Maintaining the immutability of backups may depend on the DMS being able to continue extending object locks periodically throughout the retention period of the snapshot. To ensure that there is enough time to respond to a lock extension failure before the previous lock expires (and to ensure that object locking happens in a continuous manner), the frequency of lock extension jobs (e.g., the time between when an object lock is set and when the object lock is renewed or extended) may be less than the maximum lock duration. The DMS may record all job failures and proactively notify users before the scheduled expiration time of active object locks. In some examples, while executing a periodic lock extension job, the DMS may use an object locking algorithm to minimize the number of locks created. More specifically, the DMS may ensure that each data object in the object storage location is locked at most once, even if a data object is present (e.g., referred by, relied upon, or otherwise associated with) in multiple snapshots. Minimizing the number of object locks created may reduce the storage costs associated with establishing and maintaining object immutability.

In the example of FIG. 4A, the DMS may upload a snapshot to an object storage location (such as the object storage location 210 described with reference to FIG. 2) at 405. In some cases, the DMS may transfer the snapshot from the DMS to the object storage location in accordance with a cloud archival policy associated with a computing system supported by the DMS. Once the snapshot is successfully uploaded (for example, at week 0), the DMS may apply respective immutable object locks to data objects that collectively form the snapshot. The DMS may configure the respective immutable object locks with an effective duration that is less than or equal to a maximum lock duration 455. In the timeline 400, the maximum lock duration 455 is shown as 4 weeks. However, it is to be understood that the maximum lock duration 455 could have any number of different values on the order of seconds, minutes, hours, days, weeks, months, years, etc.

At 420 (e.g., during week 2), the DMS may extend the respective immutable object locks on the data objects for the maximum lock duration 455. As illustrated in the timeline 400, the DMS may extend the respective immutable object locks before the scheduled expiration time of the previous immutable object locks. Likewise, at 425 (e.g., during week 4), the DMS may again renew the respective immutable object locks for the maximum lock duration 455. At 430 (e.g., during week 6), the DMS may determine that there are less than 4 weeks left in the retention period 415 of the snapshot (which is 9 weeks in the example of FIGS. 4A and 4B). Accordingly, the DMS may extend the respective immutable object locks for less than the maximum lock duration (e.g., 3 weeks) such that the DMS can delete the snapshot from the object storage location at 410 (after the projected expiration time of the snapshot).

In the example of FIG. 4B, the DMS may upload the snapshot to the object storage location at 405 and apply respective immutable object locks to the data objects that collectively form the snapshot. At 435 and 440, the DMS may iteratively extend the immutable object locks for the maximum lock duration 455 of 4 weeks. At 445, the DMS may receive an indication of an SLA update that reduces the retention period 415 of the snapshot (for example, from 9 weeks to 7 weeks). As such, the snapshot may expire at 450 (the expected expiration time based on the updated SLA) rather than at 410 (the expected expiration time based on the initial SLA). Accordingly, the DMS may refrain from extending the respective immutable object locks after 445 because the previous immutable object locks will be in effect until week 8 (which is after the updated expiration time of the snapshot).

Figure 5:
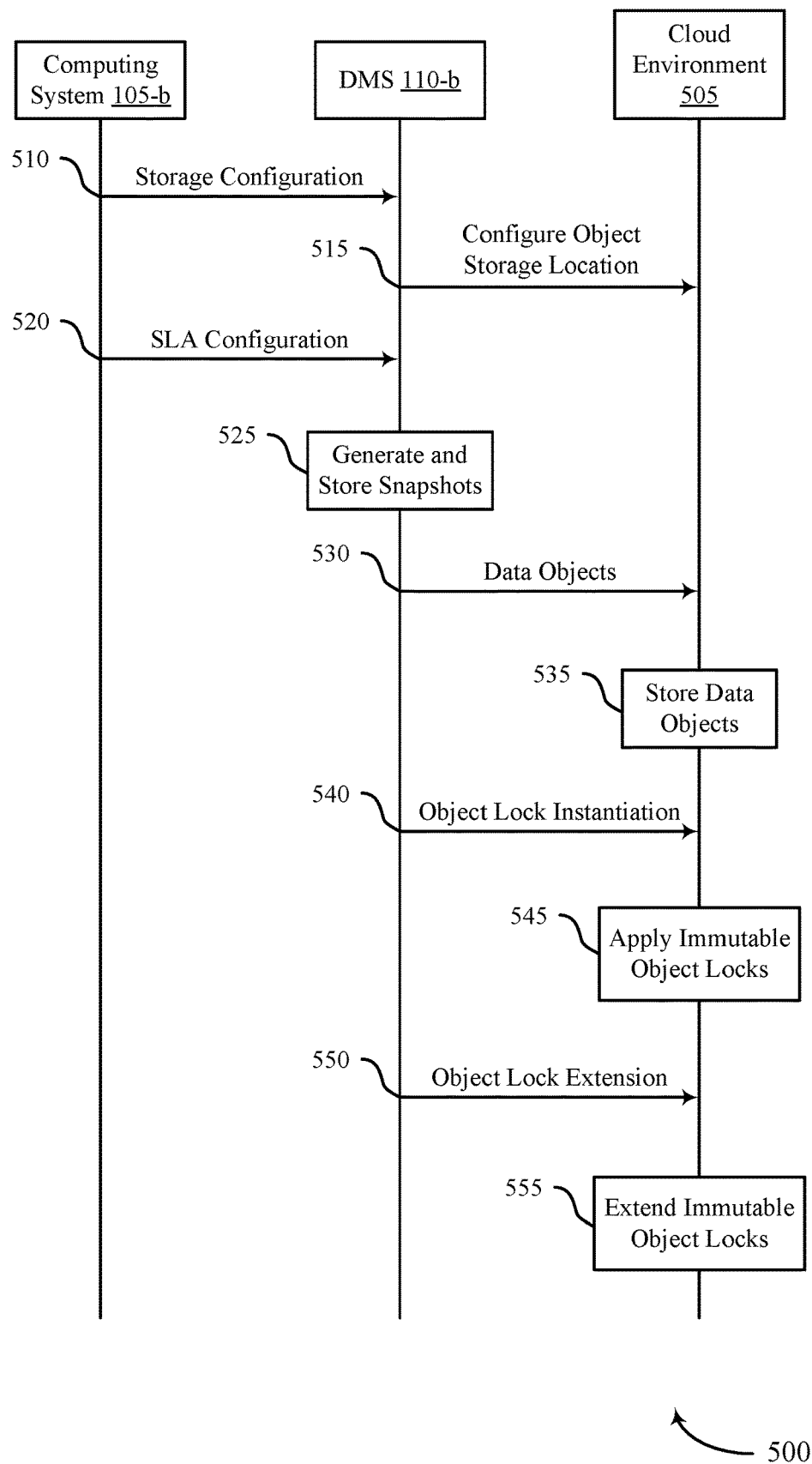
FIG. 5 illustrates an example of a process flow that supports immutable object locking for snapshot management in accordance with aspects of the present disclosure.

FIG. 5 illustrates an example of a process flow 500 that supports immutable object locking for snapshot management in accordance with aspects of the present disclosure.

The process flow 500 may implement or be implemented by aspects of the computing environment 100 or the computing environment 200. For example, the process flow 500 includes a computing system 105-b and a DMS 110-b, which may be examples of corresponding systems described with reference to FIGS. 1 and 2. The process flow: 500 also includes a cloud environment 505, which may be an example of the cloud environment 205 described with reference to FIG. 2. In the following description of the process flow: 500, operations between the computing system 105-b, the DMS 110-b, and the cloud environment 505 may be added, omitted, or performed in a different order (with respect to the exemplary order shown).

At 510, a user associated with the computing system 105-b may provide an indication of a storage configuration (for example, the storage configuration 225 described with reference to FIG. 2) to the DMS 110-b. The storage configuration may indicate various parameters (domain identifiers, credentials, settings) associated with an object storage location (for example, the object storage location 210 described with reference to FIG. 2) in the cloud environment 505.

At 515, the DMS 110-b may configure the object storage location in the cloud environment 505 according to the storage configuration provided at 510. The DMS 110-b may configure the object storage location such that the DMS 110-b can read and write data to and from the object storage location, add or delete data objects from the storage location, and/or modify object-related settings.

At 520, the DMS 110-b may obtain or otherwise retrieve an SLA configuration associated with the computing system 105-b. The SLA configuration may include a backup policy (such as the backup policy 235 described with reference to FIG. 2), an archival policy (such as the archival policy 240 described with reference to FIG. 2), a replication policy (such as the replication policy 245 described with reference to FIG. 2), and other user-defined protection policies. As described herein, the backup policy may define the frequency and type of snapshots (for example, the snapshots 135 described with reference to FIG. 1) to be taken by the DMS 110-b. The archival policy may define when snapshots of the computing system 105-b are to be archived, and for how long the archived snapshots are to be retained in storage. The replication policy may define whether snapshots of the computing system 105-b are to be replicated (e.g., copied) to different storage nodes within the DMS 110-b.

At 525, the DMS 110-b may generate and store snapshots of the computing system 105-b in accordance with the backup policy in the SLA configuration identified at 520. The snapshots may include full snapshots (such as the full snapshot 135-b described with reference to FIG. 3), incremental snapshots (such as the incremental snapshot 135-c described with reference to FIG. 3), or both. The DMS 110-b may store the snapshots across one or more storage nodes within the DMS 110-b. In some examples, the snapshots may be stored as a snapshot chain that includes a full snapshot and at least one incremental snapshot that depends from the full snapshot.

At 530, the DMS 110-b may partition the snapshots into data objects (for example, uniformly sized blocks of backup data) and transfer the resulting data objects to the object storage location in the cloud environment 505. The DMS 110-b may transfer the data objects according to the archival policy retrieved at 520 (for example, after a specified number of weeks). At 535, the DMS 110-b may store the data objects in the object storage location according to the backup configuration provided at 510.

At 540, the DMS 110-b may transmit one or more object lock commands that include instructions to apply respective immutable object locks to the data objects stored in the object storage location. At 545, the cloud environment 505 (more specifically, a third-party cloud service provider managing the cloud environment 505) may instantiate the respective immutable object locks to the data objects in accordance with the object lock command(s) from the DMS 110-b. As described herein, an immutable object lock may refer to a time-based object setting that prevent users from deleting or otherwise modifying a data object while the immutable object lock is active.

At 550, the DMS 110-b may periodically execute one or more jobs that cause one or more of the respective immutable object locks to be extended for a period of time. The DMS 110-b may determine whether to extend an immutable object lock on a given data object (and for how long to extend the immutable object lock) based on a delta between the scheduled expiration time of the immutable object lock and the projected expiration time of the associated snapshot (also referred to as the retention period of the snapshot). The DMS 110-b may also consider whether the data object is referenced in any subsequent snapshots when determining whether to extend or renew the immutable object lock on the data object. The DMS 110-b may execute the one or more jobs such that the respective immutable object locks are extended prior to the scheduled expiration time of each immutable object lock. Additionally, or alternatively, the DMS 110-b may orchestrate the one or more jobs such that at most one immutable object lock is applied to a given data object (for example, if a data object is referenced in multiple snapshots).

At 555, one or more of the respective immutable object locks may be iteratively extended in accordance with the one or more jobs executed by the DMS 110-b. The DMS 110-b may extend the respective immutable object locks for a time duration that is less than or equal to a maximum lock duration for the immutable object locks. In some examples, the DMS 110-b may cause at least one data object to be deleted from the object storage location based on determining that the at least one data object is not referenced in any later snapshots and/or that a snapshot including the at least one data object has expired. If, for example, the DMS 110-b receives an indication of an SLA update that increases or decreases the snapshot retention period for the computing system 105-b, the DMS 110-b may re-evaluate whether to extend the respective immutable object locks (and the duration for which to extend each immutable object lock) based on the updated SLA configuration.

Figure 6:
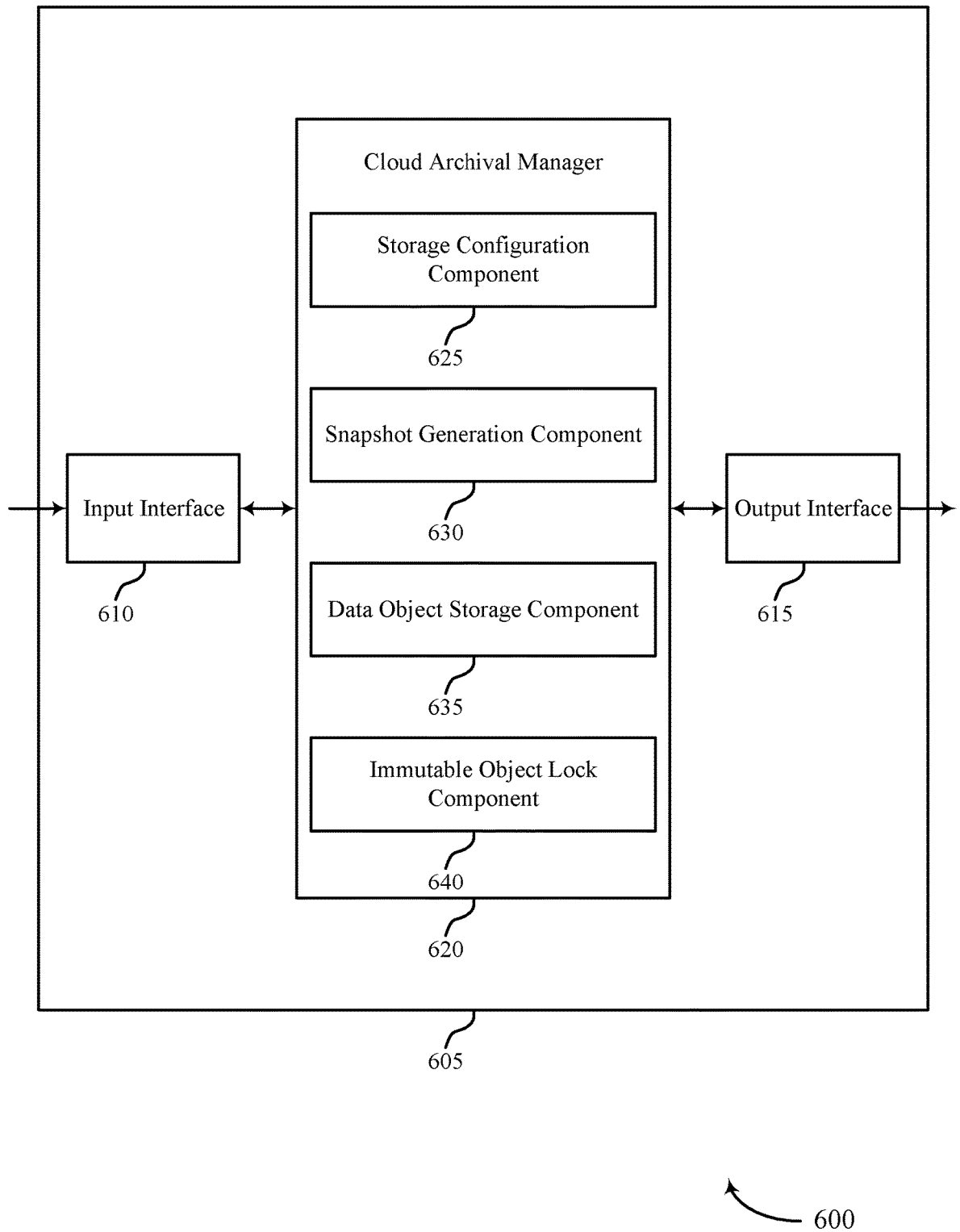
FIG. 6 illustrates a block diagram of an apparatus that supports immutable object locking for snapshot management in accordance with aspects of the present disclosure.

FIG. 6 illustrates a block diagram 600 of a system 605 that supports immutable object locking for snapshot management in accordance with aspects of the present disclosure. In some examples, the system 605 may be an example of aspects of one or more components described with reference to FIG. 1, such as a DMS 110. The system 605 may include an input interface 610, an output interface 615, and a cloud archival manager 620. The system 605 may also include one or more processors. Each of these components may be in communication with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the cloud archival manager 620 to support immutable object locking for snapshot management. In some cases, the input interface 610 may be a component of a network interface 825 as described with reference to FIG. 8.

The cloud archival manager 620 may include a storage configuration component 625, a snapshot generation component 630, a data object storage component 635, an immutable object lock component 640, or any combination thereof. In some examples, the cloud archival manager 620, or various components thereof, may be configured to perform various operations (e.g., receiving, monitoring, transmitting) using or otherwise in cooperation with the input interface 610, the output interface 615, or both. For example, the cloud archival manager 620 may receive information from the input interface 610, send information to the output interface 615, or be integrated in combination with the input interface 610, the output interface 615, or both to receive information, transmit information, or perform various other operations described herein.

The output interface 615 may manage output signaling for the system 605. For example, the output interface 615 may receive signaling from other components of the system 605, such as the cloud archival manager 620, and may transmit such output signaling corresponding to (e.g., representative of or otherwise based on) such signaling to other systems or devices. In some cases, the output interface 615 may be a component of a network interface 825, as described with reference to FIG. 8.

The cloud archival manager 620 may support data management in accordance with examples disclosed herein. The storage configuration component 625 may be configured as or otherwise support a means for receiving, at a DMS configured to manage data for a computing system, an indication of a storage configuration for an object storage location within a cloud environment. The snapshot generation component 630 may be configured as or otherwise support a means for generating, by the DMS and in accordance with a backup policy associated with the computing system, a snapshot of the computing system. The data object storage component 635 may be configured as or otherwise support a means for causing, by the DMS and in accordance with the storage configuration, one or more data objects corresponding to the snapshot to be stored in the object storage location within the cloud environment, where respective immutable object locks are applied to the one or more data objects within the object storage location. The immutable object lock component 640 may be configured as or otherwise support a means for executing, by the DMS and in accordance with the backup policy associated with the computing system, one or more jobs that cause the respective immutable object locks for the one or more data objects to be extended one or more times during a retention period for the snapshot, the retention period based at least in part on the backup policy.

Figure 7:
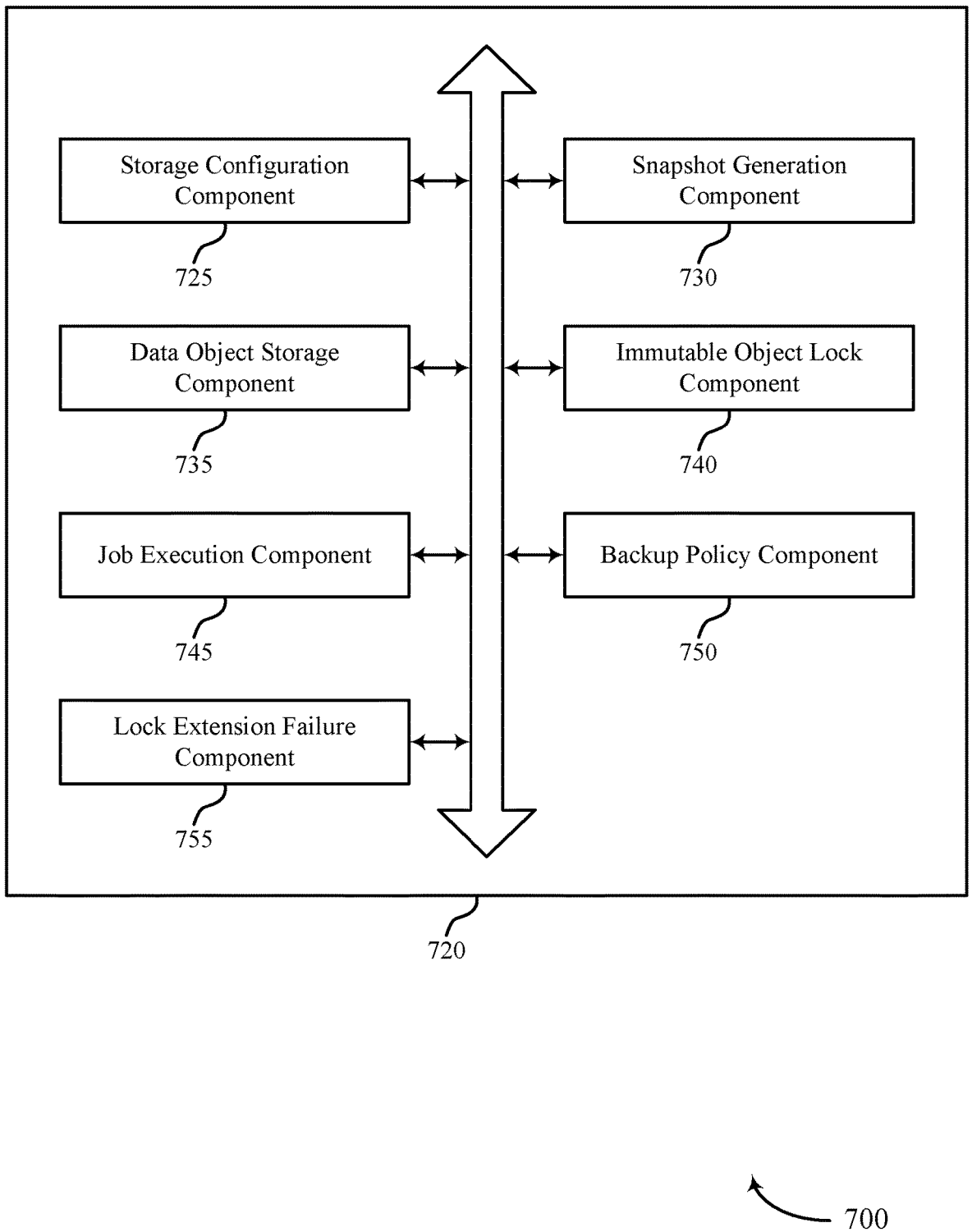
FIG. 7 illustrates a block diagram of a cloud archival manager that supports immutable object locking for snapshot management in accordance with aspects of the present disclosure.

FIG. 7 illustrates a block diagram 700 of a cloud archival manager 720 that supports immutable object locking for snapshot management in accordance with aspects of the present disclosure. The cloud archival manager 720 may be an example of aspects of a cloud archival manager or a cloud archival manager 620, or both, as described herein. The cloud archival manager 720, or various components thereof, may be an example of means for performing various aspects of immutable object locking for snapshot management as described herein. For example, the cloud archival manager 720 may include a storage configuration component 725, a snapshot generation component 730, a data object storage component 735, an immutable object lock component 740, a job execution component 745, a backup policy component 750, a lock extension failure component 755, or any combination thereof. Each of these components may communicate, directly or indirectly, with one another (e.g., via one or more buses, communications links, communications interfaces, or any combination thereof).

The cloud archival manager 720 may support data management in accordance with examples disclosed herein. The storage configuration component 725 may be configured as or otherwise support a means for receiving, at a DMS configured to manage data for a computing system, an indication of a storage configuration for an object storage location within a cloud environment. The snapshot generation component 730 may be configured as or otherwise support a means for generating, by the DMS and in accordance with a backup policy associated with the computing system, a snapshot of the computing system. The data object storage component 735 may be configured as or otherwise support a means for causing, by the DMS and in accordance with the storage configuration, one or more data objects corresponding to the snapshot to be stored in the object storage location within the cloud environment, where respective immutable object locks are applied to the one or more data objects within the object storage location. The immutable object lock component 740 may be configured as or otherwise support a means for executing, by the DMS and in accordance with the backup policy associated with the computing system, one or more jobs that cause the respective immutable object locks for the one or more data objects to be extended one or more times during a retention period for the snapshot, the retention period based at least in part on the backup policy.

In some examples, to support executing the one or more jobs, the job execution component 745 may be configured as or otherwise support a means for causing, by the DMS, an incremental object lock on a first data object to be extended after the retention period based on determining that the first data object is referenced in a subsequent snapshot of the computing system.

In some examples, to support executing the one or more jobs, the job execution component 745 may be configured as or otherwise support a means for causing, by the DMS, a first data object to be deleted from the object storage location after the retention period based on determining that the first data object is not referenced in any subsequent snapshots of the computing system.

In some examples, to support executing the one or more jobs, the job execution component 745 may be configured as or otherwise support a means for causing, by the DMS, the respective immutable object locks on the one or more data objects to be extended for a threshold lock duration specified in the storage configuration for the object storage location.

In some examples, to support executing the one or more jobs, the job execution component 745 may be configured as or otherwise support a means for causing, by the DMS, an immutable object lock on a first data object to be periodically extended two or more times during the retention period of the snapshot in accordance with the backup policy associated with the computing system.

In some examples, to support executing the one or more jobs, the job execution component 745 may be configured as or otherwise support a means for causing, by the DMS, a first immutable object lock on a first data object stored in the object storage location to be extended prior to a scheduled expiration of the first immutable object lock.

In some examples, the backup policy component 750 may be configured as or otherwise support a means for receiving, at the DMS, an indication of an updated backup policy for the computing system, the updated backup policy indicating an updated retention period for the snapshot. In some examples, the immutable object lock component 740 may be configured as or otherwise support a means for determining, by the DMS, whether to extend the respective immutable object locks on the one or more data objects based on the updated backup policy for the computing system.

In some examples, to support executing the one or more jobs, the immutable object lock component 740 may be configured as or otherwise support a means for causing, by the DMS, an immutable object lock on a first data object stored in the object storage location to be extended for a duration that is less than a threshold lock duration based on a difference between an expiration time associated with the immutable object lock and an end of the retention period for the snapshot.

In some examples, to support causing the one or more data objects to be stored in the object storage location, the data object storage component 735 may be configured as or otherwise support a means for determining, by the DMS, that two or more instances of a data object are stored in the object storage location in association with different snapshots of the computing system. In some examples, to support causing the one or more data objects to be stored in the object storage location, the immutable object lock component 740 may be configured as or otherwise support a means for causing, by the DMS, an immutable object lock to be applied to at most one of the two or more instances of the data object stored in the object storage location.

In some examples, to support executing the one or more jobs, the lock extension failure component 755 may be configured as or otherwise support a means for detecting, by the DMS, a lock extension failure associated with execution of at least one of the one or more jobs. In some examples, to support executing the one or more jobs, the lock extension failure component 755 may be configured as or otherwise support a means for outputting, by the DMS, an indication of the lock extension failure.

In some examples, to support causing the one or more data objects to be stored in the object storage location, the data object storage component 735 may be configured as or otherwise support a means for transferring, by the DMS, the one or more data objects that correspond to the snapshot of the computing system from the DMS to the object storage location in the cloud environment a threshold time duration after generating the snapshot, the threshold time duration specified in the backup policy associated with the computing system.

In some examples, the snapshot is a part of a snapshot chain that includes at least one full snapshot of the computing system and one or more incremental snapshots of the computing system.

In some examples, to support executing the one or more jobs, the immutable object lock component 740 may be configured as or otherwise support a means for causing, by the DMS, an immutable object lock on a data object from a different snapshot in the snapshot chain to be extended for at least the retention period of the snapshot based on determining that the data object is referenced in the snapshot.

In some examples, the respective immutable object locks include time-based object settings that prevent users from deleting or modifying the one or more data objects while the respective immutable object locks are active.

In some examples, the snapshot includes a full snapshot of the computing system or an incremental snapshot of the computing system, the full snapshot indicating a state of the computing system at a first time, the incremental snapshot indicating changes to the computing system between the first time and a second time.

In some examples, the snapshot includes backup data associated with the computing system. In some examples, the backup data from the snapshot is partitioned into the one or more data objects.

Figure 8:
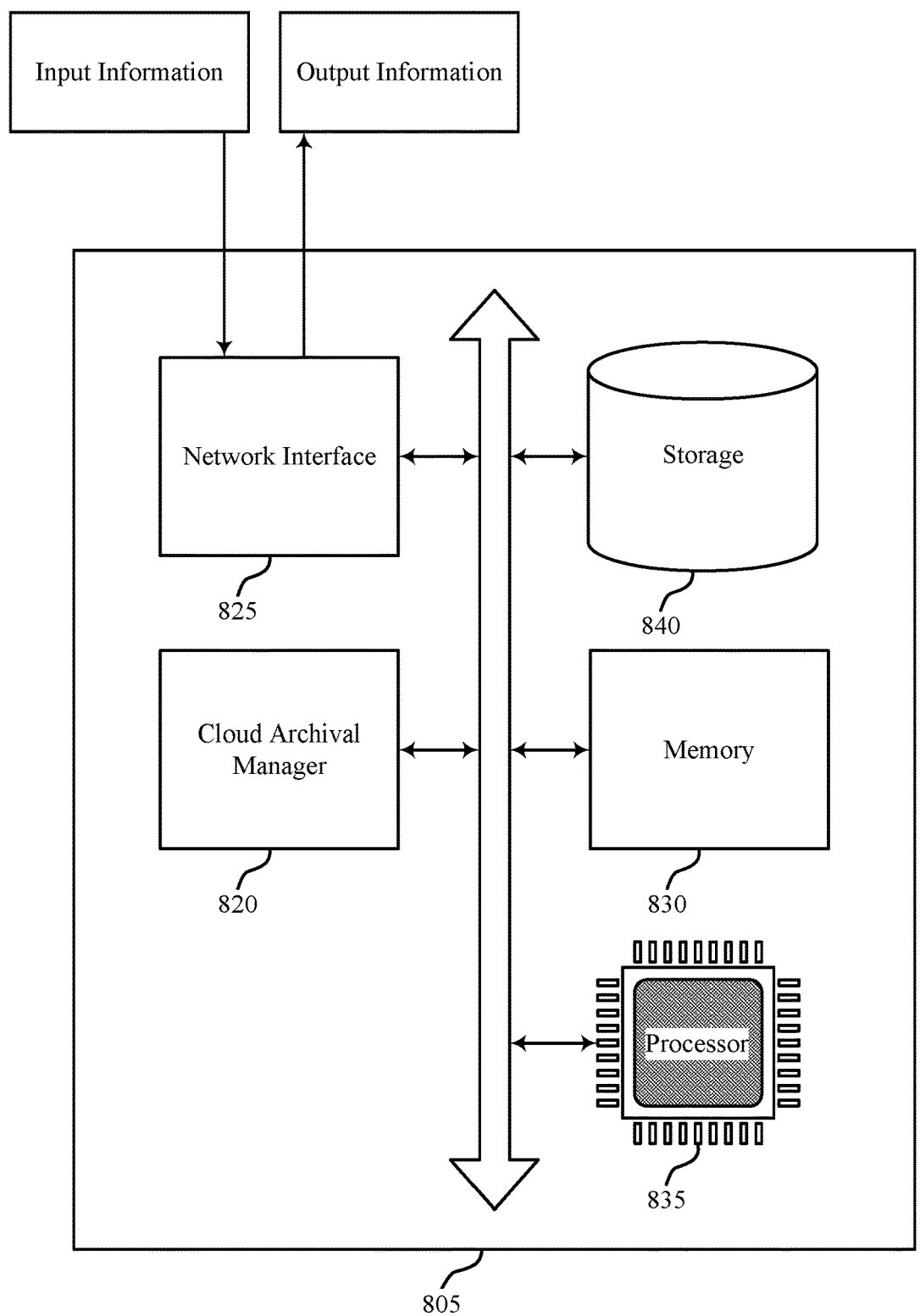
FIG. 8 illustrates a diagram of a system including a device that supports immutable object locking for snapshot management in accordance with aspects of the present disclosure.

FIG. 8 illustrates a block diagram 800 of a system 805 that supports immutable object locking for snapshot management in accordance with aspects of the present disclosure. The system 805 may be an example of or include the components of a system 605 as described herein. The system 805 may include components for data management, including components such as a cloud archival manager 820, input information, output information, a network interface 825, a memory 830, a processor 835, and a storage 840. These components may be in electronic communication or otherwise coupled with each other (e.g., operatively, communicatively, functionally, electronically, electrically: via one or more buses, communications links, communications interfaces, or any combination thereof). Additionally, the components of the system 805 may include corresponding physical components or may be implemented as corresponding virtual components (e.g., components of one or more virtual machines). In some examples, the system 805 may be an example of aspects of one or more components described with reference to FIG. 1, such as a DMS 110.

The network interface 825 may enable the system 805 to exchange information (e.g., input information, output information, or both) with other systems or devices (not shown). For example, the network interface 825 may enable the system 805 to connect to a network (e.g., a network 120) as described herein, including with reference to FIG. 1). The network interface 825 may include one or more wireless network interfaces, one or more wired network interfaces, or any combination thereof. In some examples, the network interface 825 may be an example of may be an example of aspects of one or more components described with reference to FIG. 1, such as one or more network interfaces 165.

Memory 830 may include RAM, ROM, or both. The memory 830 may store computer-readable, computer-executable software including instructions that, when executed, cause the processor 835 to perform various functions described herein. In some cases, the memory 830 may contain, among other things, a basic input/output system (BIOS), which may control basic hardware or software operation such as the interaction with peripheral components or devices. In some cases, the memory 830 may be an example of aspects of one or more components described with reference to FIG. 1, such as one or more memories 175.

The processor 835 may include an intelligent hardware device, (e.g., a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). The processor 835 may be configured to execute computer-readable instructions stored in a memory 830 to perform various functions (e.g., functions or tasks supporting immutable object locking for snapshot management). Though a single processor 835 is depicted in the example of FIG. 8, it is to be understood that the system 805 may include any quantity of one or more processors 835 and that a group of processors 835 may collectively perform one or more functions ascribed herein to a processor, such as the processor 835. In some cases, the processor 835 may be an example of aspects of one or more components described with reference to FIG. 1, such as one or more processors 170.

Storage 840 may be configured to store data that is generated, processed, stored, or otherwise used by the system 805. In some cases, the storage 840 may include one or more HDDs, one or more SDDs, or both. In some examples, the storage 840 may be an example of a single database, a distributed database, multiple distributed databases, a data store, a data lake, or an emergency backup database. In some examples, the storage 840 may be an example of one or more components described with reference to FIG. 1, such as one or more network disks 180.

The cloud archival manager 820 may support data management in accordance with examples disclosed herein. For example, the cloud archival manager 820 may be configured as or otherwise support a means for receiving, at a DMS configured to manage data for a computing system, an indication of a storage configuration for an object storage location within a cloud environment. The cloud archival manager 820 may be configured as or otherwise support a means for generating, by the DMS and in accordance with a backup policy associating with the computing system, a snapshot of the computing system. The cloud archival manager 820 may be configured as or otherwise support a means for causing, by the DMS and in accordance with the storage configuration, one or more data objects corresponding to the snapshot to be stored in the object storage location within the cloud environment, where respective immutable object locks are applied to the one or more data objects within the object storage location. The cloud archival manager 820 may be configured as or otherwise support a means for executing, by the DMS and in accordance with the backup policy associated with the computing system, one or more jobs that cause the respective immutable object locks for the one or more data objects to be extended one or more times during a retention period for the snapshot, the retention period based on the backup policy.

By including or configuring the cloud archival manager 820 in accordance with examples described herein, the system 805 (e.g., a DMS) may orchestrate cloud archival processes for computing systems at scale with greater processing efficiency and reduced manual interaction. Aspects of the present disclosure may also reduce the risk of data being lost, corrupted, or accidentally deleted by providing the system 805 with means to iteratively (re)configure immutable object locks for data objects stored in a cloud environment. Furthermore, in comparison to existing immutability schemes in which the effective duration of an immutable object lock cannot be adjusted once configured, the techniques described herein may offer greater flexibility, lower data storage costs, and reduced overhead, among other benefits.

Figure 9:
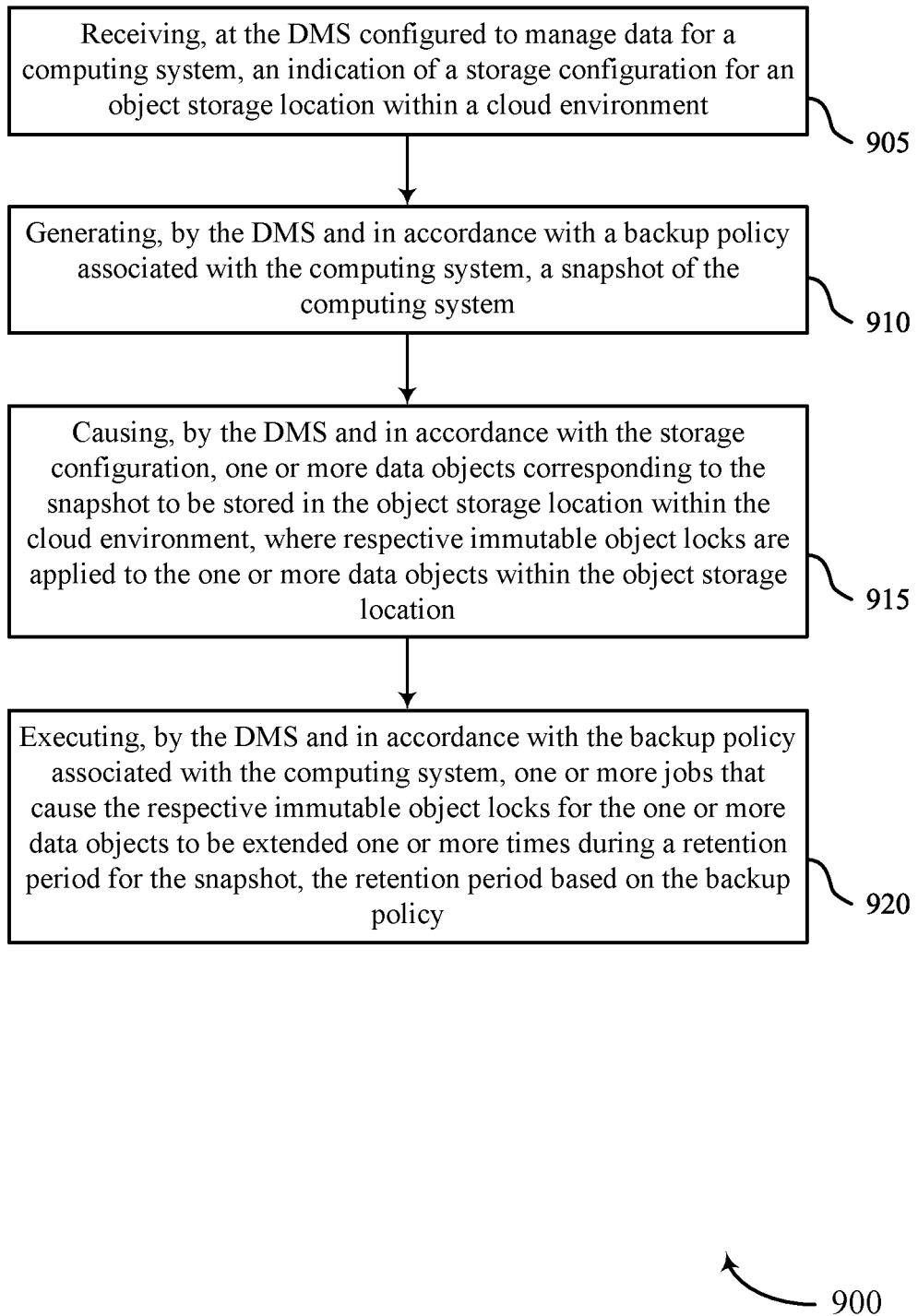
FIGS. 9 and 10 illustrate flowcharts showing methods that support immutable object locking for snapshot management in accordance with aspects of the present disclosure.

FIG. 9 illustrates a flowchart showing a method 900 that supports immutable object locking for snapshot management in accordance with aspects of the present disclosure. The operations of the method 900 may be implemented by a DMS or components thereof. For example, the operations of the method 900 may be performed by the DMS 110, as described with reference to FIG. 1. In some examples, the DMS may execute a set of instructions to control the functional elements of the DMS to perform the described functions. Additionally, or alternatively, the DMS may perform aspects of the described functions using special-purpose hardware.

At 905, the method may include receiving, at the DMS configured to manage data for a computing system, an indication of a storage configuration for an object storage location within a cloud environment. The operations of 905 may be performed in accordance with examples disclosed herein. In some examples, aspects of the operations of 905 may be performed by a storage configuration component 725, as described with reference to FIG. 7.

At 910, the method may include generating, by the DMS and in accordance with a backup policy associated with the computing system, a snapshot of the computing system. The operations of 910 may be performed in accordance with examples disclosed herein. In some examples, aspects of the operations of 910 may be performed by a snapshot generation component 730, as described with reference to FIG. 7.

At 915, the method may include causing, by the DMS and in accordance with the storage configuration, one or more data objects corresponding to the snapshot to be stored in the object storage location within the cloud environment, where respective immutable object locks are applied to the one or more data objects within the object storage location. The operations of 915 may be performed in accordance with examples disclosed herein. In some examples, aspects of the operations of 915 may be performed by a data object storage component 735, as described with reference to FIG. 7.

At 920, the method may include executing, by the DMS and in accordance with the backup policy associated with the computing system, one or more jobs that cause the respective immutable object locks for the one or more data objects to be extended one or more times during a retention period for the snapshot, the retention period based on the backup policy. The operations of 920 may be performed in accordance with examples disclosed herein. In some examples, aspects of the operations of 920 may be performed by an immutable object lock component 740, as described with reference to FIG. 7.

Figure 10:
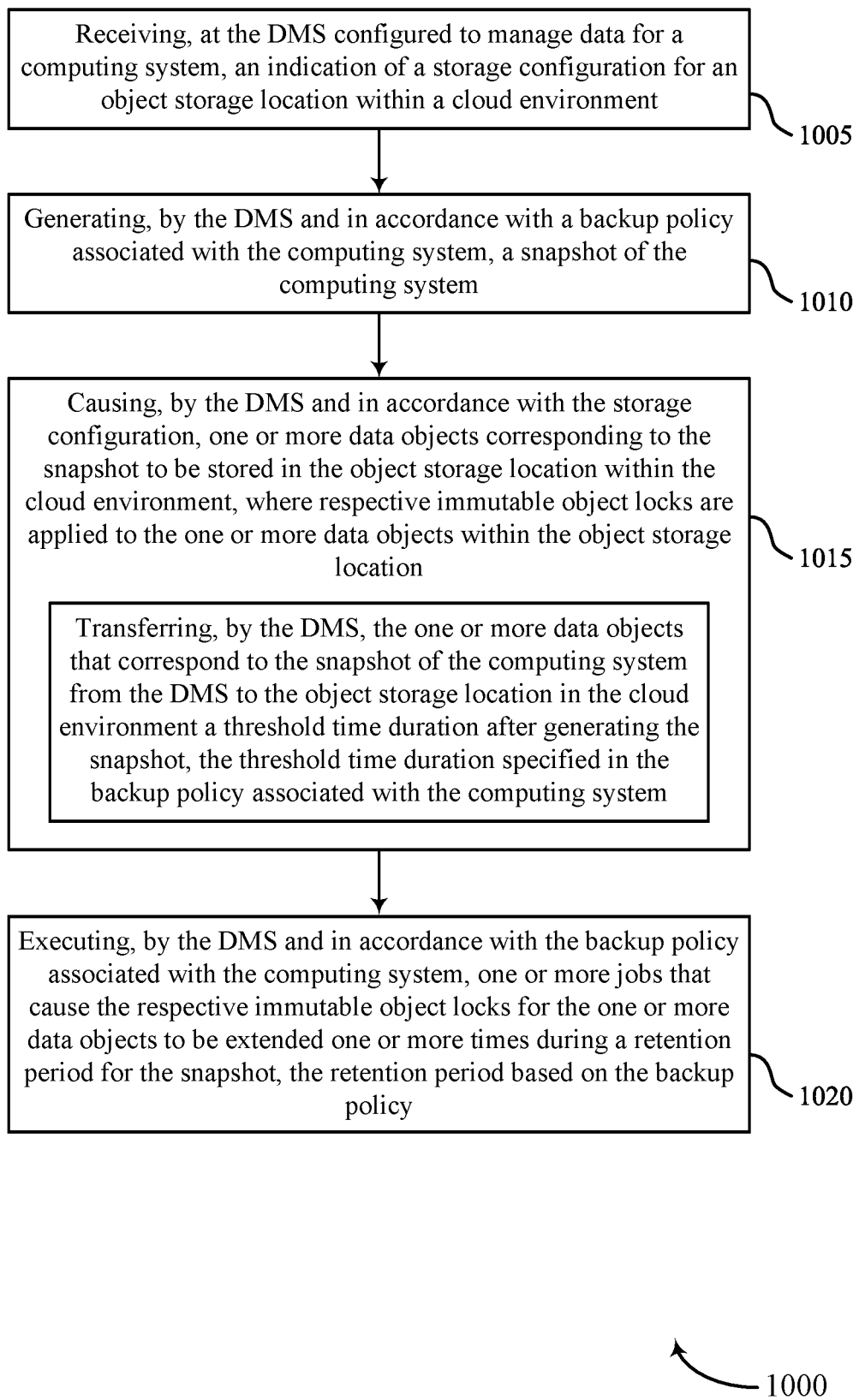

FIG. 10 illustrates a flowchart showing a method 1000 that supports immutable object locking for snapshot management in accordance with aspects of the present disclosure. The operations of the method 1000 may be implemented by a DMS or components thereof. For example, the operations of the method 1000 may be performed by the DMS 110-*a*, as described with reference to FIG. 2. In some examples, the DMS may execute a set of instructions to control the functional elements of the DMS to perform the described functions. Additionally, or alternatively, the DMS may perform aspects of the described functions using special-purpose hardware.

At 1005, the method may include receiving, at the DMS configured to manage data for a computing system, an indication of a storage configuration for an object storage location within a cloud environment. The operations of 1005 may be performed in accordance with examples disclosed herein. In some examples, aspects of the operations of 1005 may be performed by a storage configuration component 725, as described with reference to FIG. 7.

At 1010, the method may include generating, by the DMS and in accordance with a backup policy associated with the computing system, a snapshot of the computing system. The operations of 1010 may be performed in accordance with examples disclosed herein. In some examples, aspects of the operations of 1010 may be performed by a snapshot generation component 730, as described with reference to FIG. 7.

At 1015, the method may include causing, by the DMS and in accordance with the storage configuration, one or more data objects corresponding to the snapshot to be stored in the object storage location within the cloud environment, where respective immutable object locks are applied to the one or more data objects within the object storage location. In some examples, causing the one or more data objects to be stored in the object storage location may include transferring, by the DMS, the one or more data objects that correspond to the snapshot of the computing system from the DMS to the object storage location in the cloud environment a threshold time duration after generating the snapshot, the threshold time duration specified in the backup policy associated with the computing system. The operations of 1015 may be performed in accordance with examples disclosed herein. In some examples, aspects of the operations of 1015 may be performed by a data object storage component 735, as described with reference to FIG. 7.

At 1020, the method may include executing, by the DMS and in accordance with the backup policy associated with the computing system, one or more jobs that cause the respective immutable object locks for the one or more data objects to be extended one or more times during a retention period for the snapshot, the retention period based on the backup policy. The operations of 1020 may be performed in accordance with examples disclosed herein. In some examples, aspects of the operations of 1020 may be performed by an immutable object lock component 740, as described with reference to FIG. 7.

A method for data management is described. The method may include receiving, at a DMS configured to manage data for a computing system, an indication of a storage configuration for an object storage location within a cloud environment. The method may further include generating, by the DMS and in accordance with a backup policy associated with the computing system, a snapshot of the computing system. The method may further include causing, by the DMS and in accordance with the storage configuration, one or more data objects corresponding to the snapshot to be stored in the object storage location within the cloud environment, where respective immutable object locks are applied to the one or more data objects within the object storage location. The method may further include executing, by the DMS and in accordance with the backup policy associated with the computing system, one or more jobs that cause the respective immutable object locks for the one or more data objects to be extended one or more times during a retention period for the snapshot, the retention period based on the backup policy.

An apparatus for data management is described. The apparatus may include a processor, memory coupled with the processor, and instructions stored in the memory. The instructions may be executable by the processor to cause the apparatus to receive, at a DMS configured to manage data for a computing system, an indication of a storage configuration for an object storage location within a cloud environment. The instructions may be further executable by the processor to cause the apparatus to generate, by the DMS and in accordance with a backup policy associate with the computing system, a snapshot of the computing system. The instructions may be further executable by the processor to cause the apparatus to cause, by the DMS and in accordance with the storage configuration, one or more data objects corresponding to the snapshot to be stored in the object storage location within the cloud environment, where respective immutable object locks are applied to the one or more data objects within the object storage location. The instructions may be further executable by the processor to cause the apparatus to execute, by the DMS and in accordance with the backup policy associated with the computing system, one or more jobs that cause the respective immutable object locks for the one or more data objects to be extended one or more times during a retention period for the snapshot, the retention period based on the backup policy.

Another apparatus for data management is described. The apparatus may include means for receiving, at a DMS configured to manage data for a computing system, an indication of a storage configuration for an object storage location within a cloud environment. The apparatus may further include means for generating, by the DMS and in accordance with a backup policy associated with the computing system, a snapshot of the computing system. The apparatus may further include means for causing, by the DMS and in accordance with the storage configuration, one or more data objects corresponding to the snapshot to be stored in the object storage location within the cloud environment, where respective immutable object locks are applied to the one or more data objects within the object storage location. The apparatus may further include means for executing, by the DMS and in accordance with the backup policy associated with the computing system, one or more jobs that cause the respective immutable object locks for the one or more data objects to be extended one or more times during a retention period for the snapshot, the retention period based on the backup policy.

A non-transitory computer-readable medium storing code for data management is described. The code may include instructions executable by a processor to receive, at a DMS configured to manage data for a computing system, an indication of a storage configuration for an object storage location within a cloud environment. The instructions may be further executable by the processor to generate, by the DMS and in accordance with a backup policy associate with the computing system, a snapshot of the computing system. The instructions may be further executable by the processor to cause, by the DMS and in accordance with the storage configuration, one or more data objects corresponding to the snapshot to be stored in the object storage location within the cloud environment, where respective immutable object locks are applied to the one or more data objects within the object storage location. The instructions may be further executable by the processor to execute, by the DMS and in accordance with the backup policy associated with the computing system, one or more jobs that cause the respective immutable object locks for the one or more data objects to be extended one or more times during a retention period for the snapshot, the retention period based on the backup policy.

In some examples of the methods, apparatuses, and non-transitory computer-readable media described herein, executing the one or more jobs may include operations, features, means, or instructions for causing, by the DMS, an incremental object lock on a first data object to be extended after the retention period based on determining that the first data object is referenced in a subsequent snapshot of the computing system.

In some examples of the methods, apparatuses, and non-transitory computer-readable media described herein, executing the one or more jobs may include operations, features, means, or instructions for causing, by the DMS, a first data object to be deleted from the object storage location after the retention period based on determining that the first data object is not referenced in any subsequent snapshots of the computing system.

In some examples of the methods, apparatuses, and non-transitory computer-readable media described herein, executing the one or more jobs may include operations, features, means, or instructions for causing, by the DMS, the respective immutable object locks on the one or more data objects to be extended for a threshold lock duration specified in the storage configuration for the object storage location.

In some examples of the methods, apparatuses, and non-transitory computer-readable media described herein, executing the one or more jobs may include operations, features, means, or instructions for causing, by the DMS, an immutable object lock on a first data object to be periodically extended two or more times during the retention period of the snapshot in accordance with the backup policy associated with the computing system.

In some examples of the methods, apparatuses, and non-transitory computer-readable media described herein, executing the one or more jobs may include operations, features, means, or instructions for causing, by the DMS, a first immutable object lock on a first data object stored in the object storage location to be extended prior to a scheduled expiration of the first immutable object lock.

Some examples of the methods, apparatuses, and non-transitory computer-readable media described herein may further include operations, features, means, or instructions for receiving, at the DMS, an indication of an updated backup policy for the computing system, the updated backup policy indicating an updated retention period for the snapshot.

Some examples of the methods, apparatuses, and non-transitory computer-readable media described herein may further include operations, features, means, or instructions for determining, by the DMS, whether to extend the respective immutable object locks on the one or more data objects based on the updated backup policy for the computing system.

In some examples of the methods, apparatuses, and non-transitory computer-readable media described herein, executing the one or more jobs may include operations, features, means, or instructions for causing, by the DMS, an immutable object lock on a first data object stored in the object storage location to be extended for a duration that is less than a threshold lock duration based on a difference between an expiration time associated with the immutable object lock and an end of the retention period for the snapshot.

In some examples of the methods, apparatuses, and non-transitory computer-readable media described herein, causing the one or more data objects to be stored in the object storage location may include operations, features, means, or instructions for determining, by the DMS, that two or more instances of a data object are stored in the object storage location in association with different snapshots of the computing system.

In some examples of the methods, apparatuses, and non-transitory computer-readable media described herein, causing the one or more data objects to be stored in the object storage location may include operations, features, means, or instructions for causing, by the DMS, an immutable object lock to be applied to at most one of the two or more instances of the data object stored in the object storage location.

In some examples of the methods, apparatuses, and non-transitory computer-readable media described herein, executing the one or more jobs may include operations, features, means, or instructions for detecting, by the DMS, a lock extension failure associated with execution of at least one of the one or more jobs In some examples of the methods, apparatuses, and non-transitory computer-readable media described herein, executing the one or more jobs may include operations, features, means, or instructions for outputting, by the DMS, an indication of the lock extension failure.

In some examples of the methods, apparatuses, and non-transitory computer-readable media described herein, causing the one or more data objects to be stored in the object storage location may include operations, features, means, or instructions for transferring, by the DMS, the one or more data objects that correspond to the snapshot of the computing system from the DMS to the object storage location in the cloud environment a threshold time duration after generating the snapshot, the threshold time duration specified in the backup policy associated with the computing system.

In some examples of the methods, apparatuses, and non-transitory computer-readable media described herein, the snapshot may be a part of a snapshot chain that includes at least one full snapshot of the computing system and one or more incremental snapshots of the computing system.

In some examples of the methods, apparatuses, and non-transitory computer-readable media described herein, executing the one or more jobs may include operations, features, means, or instructions for causing, by the DMS, an immutable object lock on a data object from a different snapshot in the snapshot chain to be extended for at least the retention period of the snapshot based on determining that the data object are referenced in the snapshot.

In some examples of the methods, apparatuses, and non-transitory computer-readable media described herein, the respective immutable object locks include time-based object settings that prevent users from deleting or modifying the one or more data objects while the respective immutable object locks are active.

In some examples of the methods, apparatuses, and non-transitory computer-readable media described herein, the snapshot includes a full snapshot of the computing system or an incremental snapshot of the computing system, the full snapshot indicating a state of the computing system at a first time, the incremental snapshot indicating changes to the computing system between the first time and a second time.

In some examples of the methods, apparatuses, and non-transitory computer-readable media described herein, the snapshot includes backup data associated with the computing system, and the backup data from the snapshot is partitioned into the one or more data objects.

The following provides an overview of aspects of the present disclosure:

Aspect 1: A method for data management, comprising: receiving, at a data management system configured to manage data for a computing system, an indication of a storage configuration for an object storage location within a cloud environment: generating, by the data management system and in accordance with a backup policy associated with the computing system, a snapshot of the computing system: causing, by the data management system and in accordance with the storage configuration, one or more data objects corresponding to the snapshot to be stored in the object storage location within the cloud environment, wherein respective immutable object locks are applied to the one or more data objects within the object storage location: and executing, by the data management system and in accordance with the backup policy associated with the computing system, one or more jobs that cause the respective immutable object locks for the one or more data objects to be extended one or more times during a retention period for the snapshot, the retention period based on the backup policy.

Aspect 2: The method of aspect 1, wherein executing the one or more jobs comprises: causing, by the data management system, an incremental object lock on a first data object to be extended after the retention period based at least in part on determining that the first data object is referenced in a subsequent snapshot of the computing system.

Aspect 3: The method of any of aspects 1 through 2, wherein executing the one or more jobs comprises: causing, by the data management system, a first data object to be deleted from the object storage location after the retention period based at least in part on determining that the first data object is not referenced in any subsequent snapshots of the computing system.

Aspect 4: The method of any of aspects 1 through 3, wherein executing the one or more jobs comprises: causing, by the data management system, the respective immutable object locks on the one or more data objects to be extended for a threshold lock duration specified in the storage configuration for the object storage location.

Aspect 5: The method of any of aspects 1 through 4, wherein executing the one or more jobs comprises: causing, by the data management system, an immutable object lock on a first data object to be periodically extended two or more times during the retention period of the snapshot in accordance with the backup policy associated with the computing system.

Aspect 6: The method of any of aspects 1 through 5, wherein executing the one or more jobs comprises: causing, by the data management system, a first immutable object lock on a first data object stored in the object storage location to be extended prior to a scheduled expiration of the first immutable object lock.

Aspect 7: The method of any of aspects 1 through 6, further comprising: receiving, at the data management system, an indication of an updated backup policy for the computing system, the updated backup policy indicating an updated retention period for the snapshot: and determining, by the data management system, whether to extend the respective immutable object locks on the one or more data objects based at least in part on the updated backup policy for the computing system.

Aspect 8: The method of any of aspects 1 through 7, wherein executing the one or more jobs comprises: causing, by the data management system, an immutable object lock on a first data object stored in the object storage location to be extended for a duration that is less than a threshold lock duration based at least in part on a difference between an expiration time associated with the immutable object lock and an end of the retention period for the snapshot.

Aspect 9: The method of any of aspects 1 through 8, wherein causing the one or more data objects to be stored in the object storage location comprises: determining, by the data management system, that two or more instances of a data object are stored in the object storage location in association with different snapshots of the computing system: and causing, by the data management system, an immutable object lock to be applied to at most one of the two or more instances of the data object stored in the object storage location.

Aspect 10: The method of any of aspects 1 through 9, wherein executing the one or more jobs comprises: detecting, by the data management system, a lock extension failure associated with execution of at least one of the one or more jobs: and outputting, by the data management system, an indication of the lock extension failure.

Aspect 11: The method of any of aspects 1 through 10, wherein causing the one or more data objects to be stored in the object storage location comprises: transferring, by the data management system, the one or more data objects that correspond to the snapshot of the computing system from the data management system to the object storage location in the cloud environment a threshold time duration after generating the snapshot, the threshold time duration specified in the backup policy associated with the computing system.

Aspect 12: The method of any of aspects 1 through 11, wherein the snapshot is a part of a snapshot chain that comprises at least one full snapshot of the computing system and one or more incremental snapshots of the computing system.

Aspect 13: The method of aspect 12, wherein executing the one or more jobs comprises: causing, by the data management system, an immutable object lock on a data object from a different snapshot in the snapshot chain to be extended for at least the retention period of the snapshot based at least in part on determining that the data object is referenced in the snapshot.

Aspect 14: The method of any of aspects 1 through 13, wherein the respective immutable object locks comprise time-based object settings that prevent users from deleting or modifying the one or more data objects while the respective immutable object locks are active.

Aspect 15: The method of any of aspects 1 through 14, wherein the snapshot comprises a full snapshot of the computing system or an incremental snapshot of the computing system, the full snapshot indicating a state of the computing system at a first time, the incremental snapshot indicating changes to the computing system between the first time and a second time.

Aspect 16: The method of any of aspects 1 through 15, wherein the snapshot comprises backup data associated with the computing system: and the backup data from the snapshot is partitioned into the one or more data objects.

Aspect 17: An apparatus for data management, comprising: a processor: memory coupled with the processor: and instructions stored in the memory and executable by the processor to cause the apparatus to perform a method of any of aspects 1 through 16.

Aspect 18: An apparatus for data management, comprising: at least one means for performing a method of any of aspects 1 through 16.

Aspect 19: A non-transitory computer-readable medium storing code for data management, the code comprising instructions executable by a processor to perform a method of any of aspects 1 through 16.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary." used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data management, comprising:
receiving, at a data management system configured to manage data for a computing system in accordance with a backup policy, an indication of a storage configuration for an object storage location within a cloud environment;
transferring, by the data management system and in accordance with the storage configuration, one or more data objects corresponding to a snapshot of the computing system for storage in the object storage location within the cloud environment, wherein the snapshot comprises a computing file that represents a state of the computing system, and wherein respective immutable object locks are applied to the one or more data objects within the object storage location; and
outputting, by the data management system and in accordance with the backup policy associated with the computing system, one or more object lock commands that cause the respective immutable object locks for the one or more data objects to be extended one or more times during a retention period for the snapshot, the retention period based at least in part on the backup policy.

2. The method of claim 1, wherein the one or more object lock commands are configured to extend an incremental object lock on a first data object after the retention period based at least in part on determining that the first data object is referenced in a subsequent snapshot of the computing system.

3. The method of claim 1, wherein the one or more object lock commands are configured to delete a first data object from the object storage location after the retention period based at least in part on determining that the first data object is not referenced in any subsequent snapshots of the computing system.

4. The method of claim 1, wherein the one or more object lock commands are configured to extend the respective immutable object locks on the one or more data objects for a threshold lock duration specified in the storage configuration for the object storage location.

5. The method of claim 1, wherein:
the one or more object lock commands are configured to periodically extend an immutable object lock on a first data object two or more times during the retention period of the snapshot in accordance with the backup policy associated with the computing system.

6. The method of claim 1, wherein the one or more object lock commands are configured to extend a first immutable object lock on a first data object stored in the object storage location prior to a scheduled expiration of the first immutable object lock.

7. The method of claim 1, further comprising:
receiving, at the data management system, an indication of an updated backup policy for the computing system, the updated backup policy indicating an updated retention period for the snapshot; and
determining, by the data management system, whether to extend the respective immutable object locks on the one or more data objects based at least in part on the updated backup policy for the computing system.

8. The method of claim 1, wherein the one or more object lock commands are configured to extend an immutable object lock on a first data object stored in the object storage location for a duration that is less than a threshold lock duration based at least in part on a difference between an expiration time associated with the immutable object lock and an end of the retention period for the snapshot.

9. The method of claim 1, wherein causing the one or more data objects to be stored in the object storage location comprises:
determining, by the data management system, that two or more instances of a data object are stored in the object storage location in association with different snapshots of the computing system,
wherein the one or more object lock commands are configured to apply an immutable object lock to at most one of the two or more instances of the data object stored in the object storage location.

10. The method of claim 1, further comprising:
detecting, by the data management system, a lock extension failure associated with transmission of the one or more object lock commands; and
outputting, by the data management system, an indication of the lock extension failure.

11. The method of claim 1, wherein the one or more data objects are transferred a threshold time duration after generating the snapshot, the threshold time duration specified in the backup policy associated with the computing system.

12. The method of claim 1, wherein the snapshot is a part of a snapshot chain that comprises at least one full snapshot of the computing system and one or more incremental snapshots of the computing system.

13. The method of claim 12, wherein the one or more object lock commands are configured to extend an immutable object lock on a data object from a different snapshot in the snapshot chain for at least the retention period of the snapshot based at least in part on determining that the data object is referenced in the snapshot.

14. The method of claim 1, wherein the respective immutable object locks comprise time-based object settings that prevent users from deleting or modifying the one or more data objects while the respective immutable object locks are active.

15. The method of claim 1, wherein the snapshot comprises a full snapshot of the computing system or an incremental snapshot of the computing system, the full snapshot indicating a state of the computing system at a first time, the incremental snapshot indicating changes to the computing system between the first time and a second time.

16. The method of claim 1, wherein:
the snapshot comprises backup data associated with the computing system; and
the backup data from the snapshot is partitioned into the one or more data objects.

17. An apparatus for data management, comprising:
a processor;
memory coupled with the processor; and
instructions stored in the memory and executable by the processor to cause the apparatus to
receive, at a data management system configured to manage data for a computing system in accordance with a backup policy, an indication of a storage configuration for an object storage location within a cloud environment;
transfer, by the data management system and in accordance with the storage configuration, one or more data objects corresponding to a snapshot of the computing system for storage in the object storage location within the cloud environment, wherein the snapshot comprises a computing file that represents a state of the computing system, and wherein respective immutable object locks are applied to the one or more data objects within the object storage location; and
output, by the data management system and in accordance with the backup policy associated with the computing system, one or more object lock commands that cause the respective immutable object locks for the one or more data objects to be extended one or more times during a retention period for the snapshot, the retention period based at least in part on the backup policy.

18. The apparatus of claim 17, wherein the one or more object lock commands are configured to extend an incremental object lock on a first data object after the retention period based at least in part on determining that the first data object is referenced in a subsequent snapshot of the computing system.

19. The apparatus of claim 17, wherein the one or more object lock commands are configured to delete a first data object from the object storage location after the retention period based at least in part on determining that the first data object is not referenced in any subsequent snapshots of the computing system.

20. A non-transitory computer-readable medium storing code for data management, the code comprising instructions executable by a processor to:
receive, at a data management system configured to manage data for a computing system in accordance with a backup policy, an indication of a storage configuration for an object storage location within a cloud environment;

transfer, by the data management system and in accordance with the storage configuration, one or more data objects corresponding to a snapshot of the computing system for storage in the object storage location within the cloud environment, wherein the snapshot comprises a computing file that represents a state of the computing system, and wherein respective immutable object locks are applied to the one or more data objects within the object storage location; and output, by the data management system and in accordance with the backup policy associated with the computing system, one or more object lock commands that cause the respective immutable object locks for the one or more data objects to be extended one or more times during a retention period for the snapshot, the retention period based at least in part on the backup policy.

* * * * *